US006257729B1

(12) United States Patent
Kurosawa

(10) Patent No.: US 6,257,729 B1
(45) Date of Patent: Jul. 10, 2001

(54) PROJECTOR

(75) Inventor: Shogo Kurosawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/536,692

(22) Filed: Mar. 28, 2000

(30) Foreign Application Priority Data

Mar. 29, 1999 (JP) ................................................. 11-086956

(51) Int. Cl.$^7$ ................................................. G03B 21/14
(52) U.S. Cl. ................................................. 353/119
(58) Field of Search ................................. 353/119, 122; 16/273, 337

(56) References Cited

U.S. PATENT DOCUMENTS

| 4,715,705 | * | 12/1987 | Nord | 353/120 |
| 5,382,991 | * | 1/1995 | Rodriguez, Jr. et al. | 353/119 |
| 6,185,052 | * | 2/2001 | Fujimori et al. | 359/819 |

FOREIGN PATENT DOCUMENTS

| 60-49677 | 4/1985 | (JP) . |
| 7-113996 | 5/1995 | (JP) . |

* cited by examiner

Primary Examiner—William Dowling
(74) Attorney, Agent, or Firm—Oliff & Berridge, PLC

(57) ABSTRACT

To provide a projector in which the position of a handle can be reliably maintained even when a housing and the handle are made of different materials. In a projector, the position of a handle is maintained with projections formed in the handle and contact portions of a lower casing being in contact with each other, and both the projections and the contact portions may be made of a same kind of material, such as resin. Therefore, there is no fear that one of the projections and the contact portions will undergo localized wear. Even when the lower casing is made of metal and the handle is made of resin, the handle can sufficiently withstand repetitive operations, and the position thereof can be reliably maintained.

9 Claims, 8 Drawing Sheets

[Fig. 1]
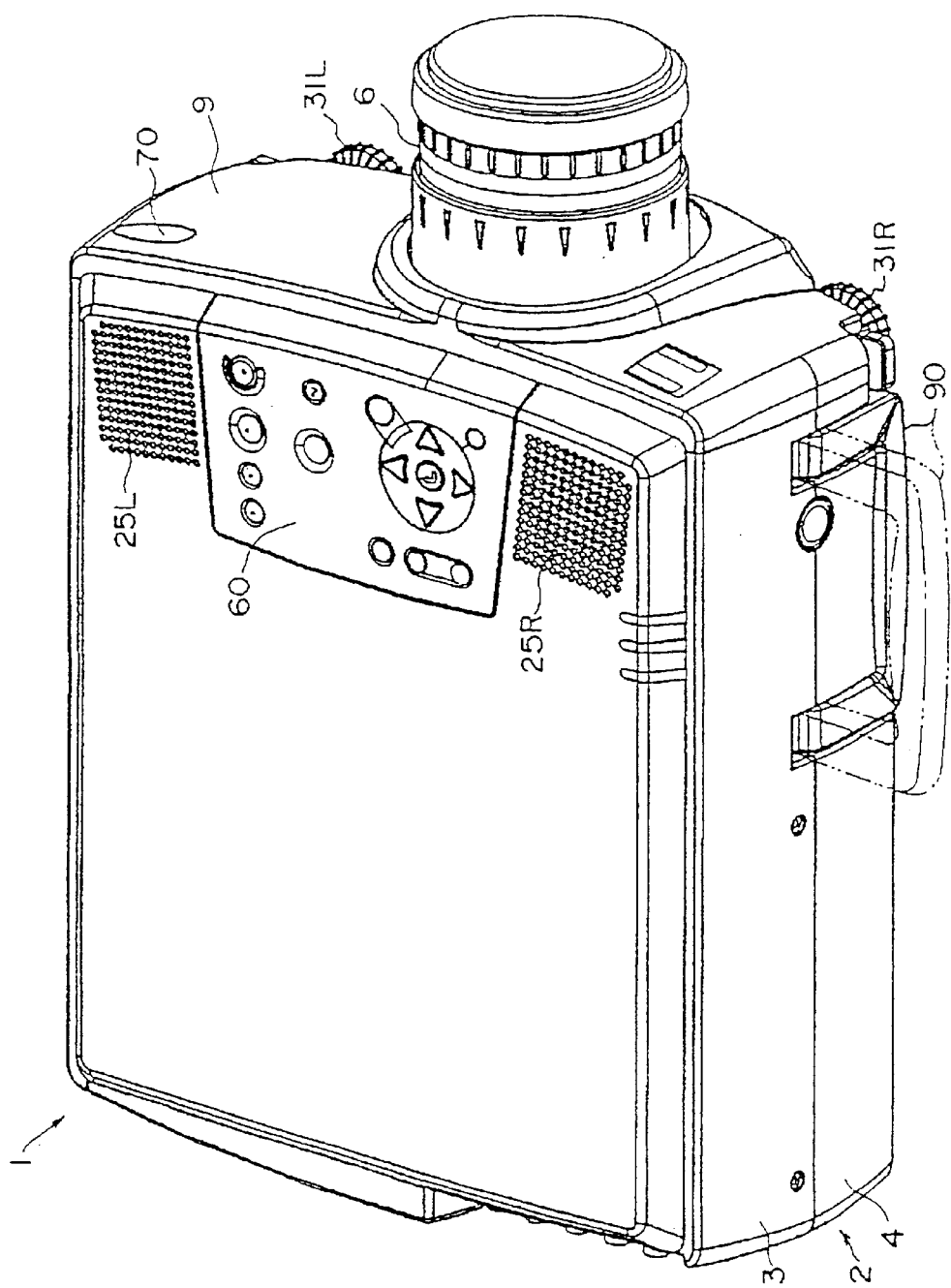

[Fig. 2]
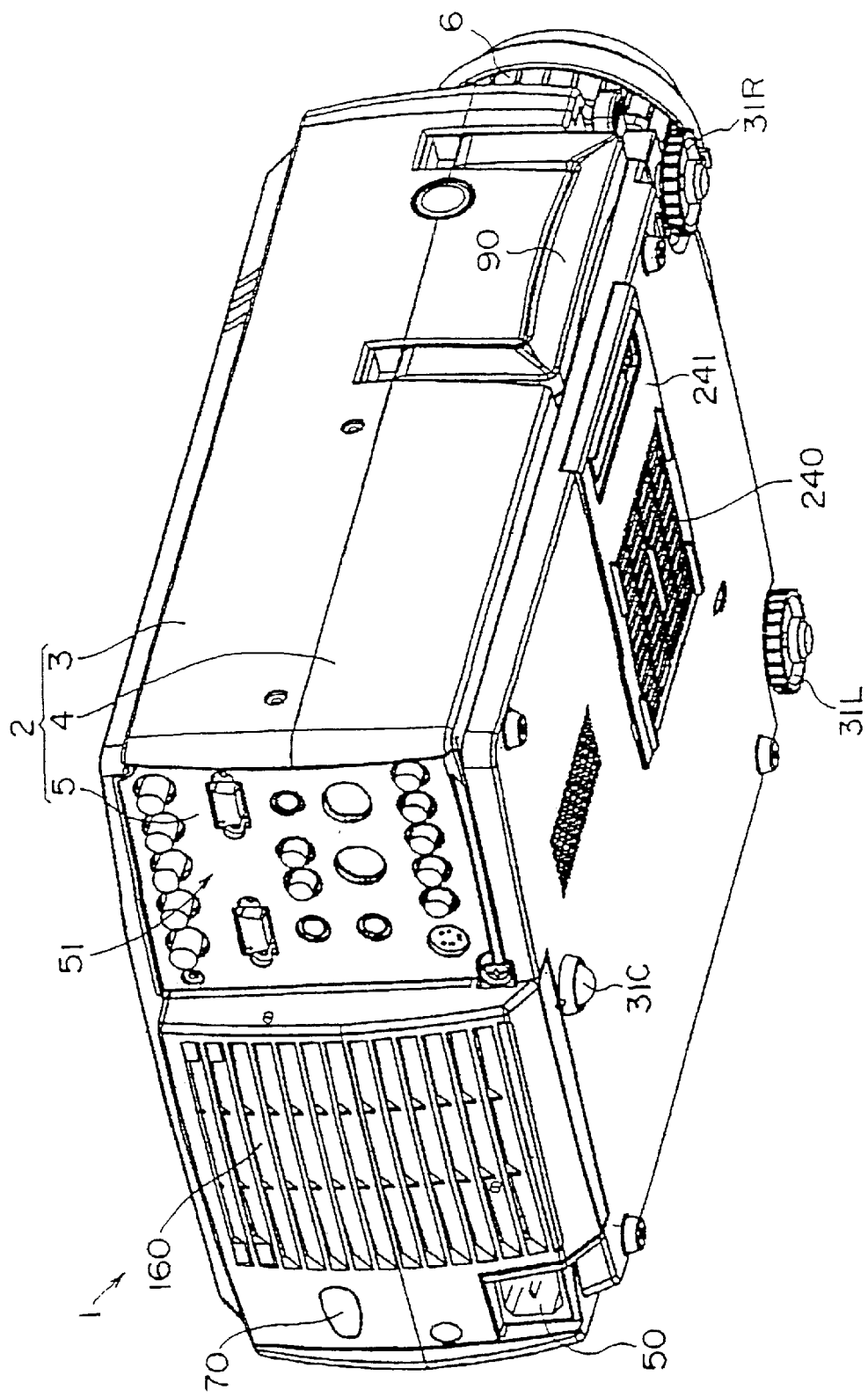

[Fig. 3]
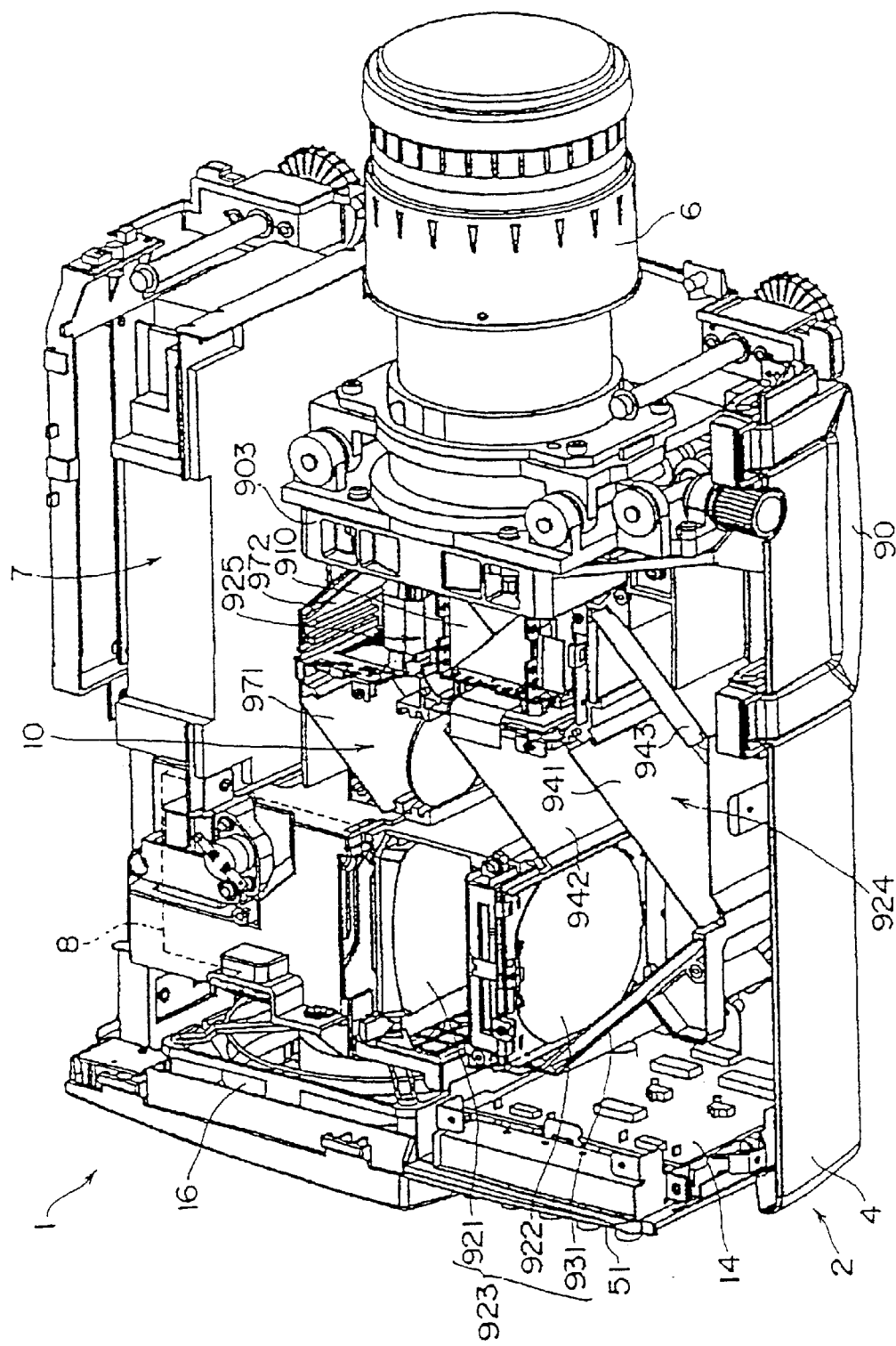

[Fig. 4]
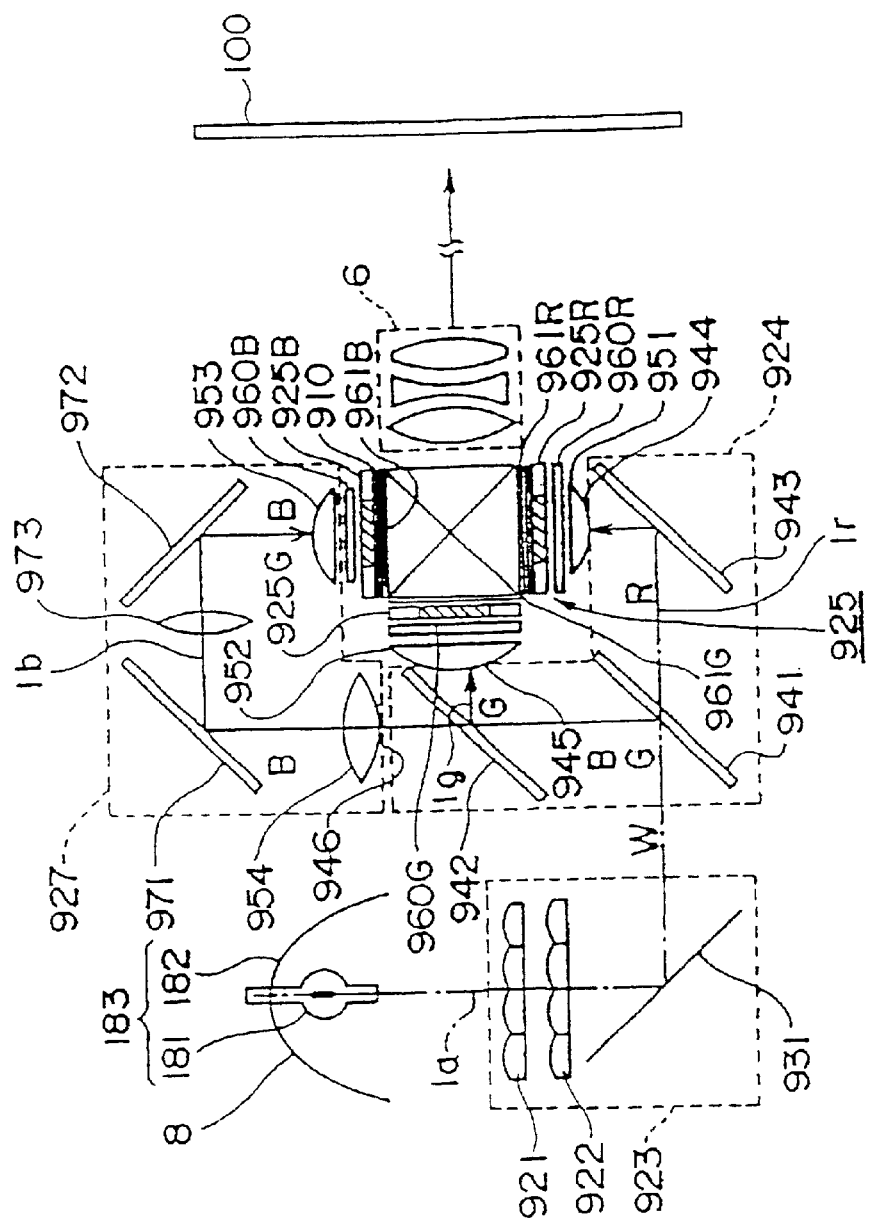

[Fig. 5]
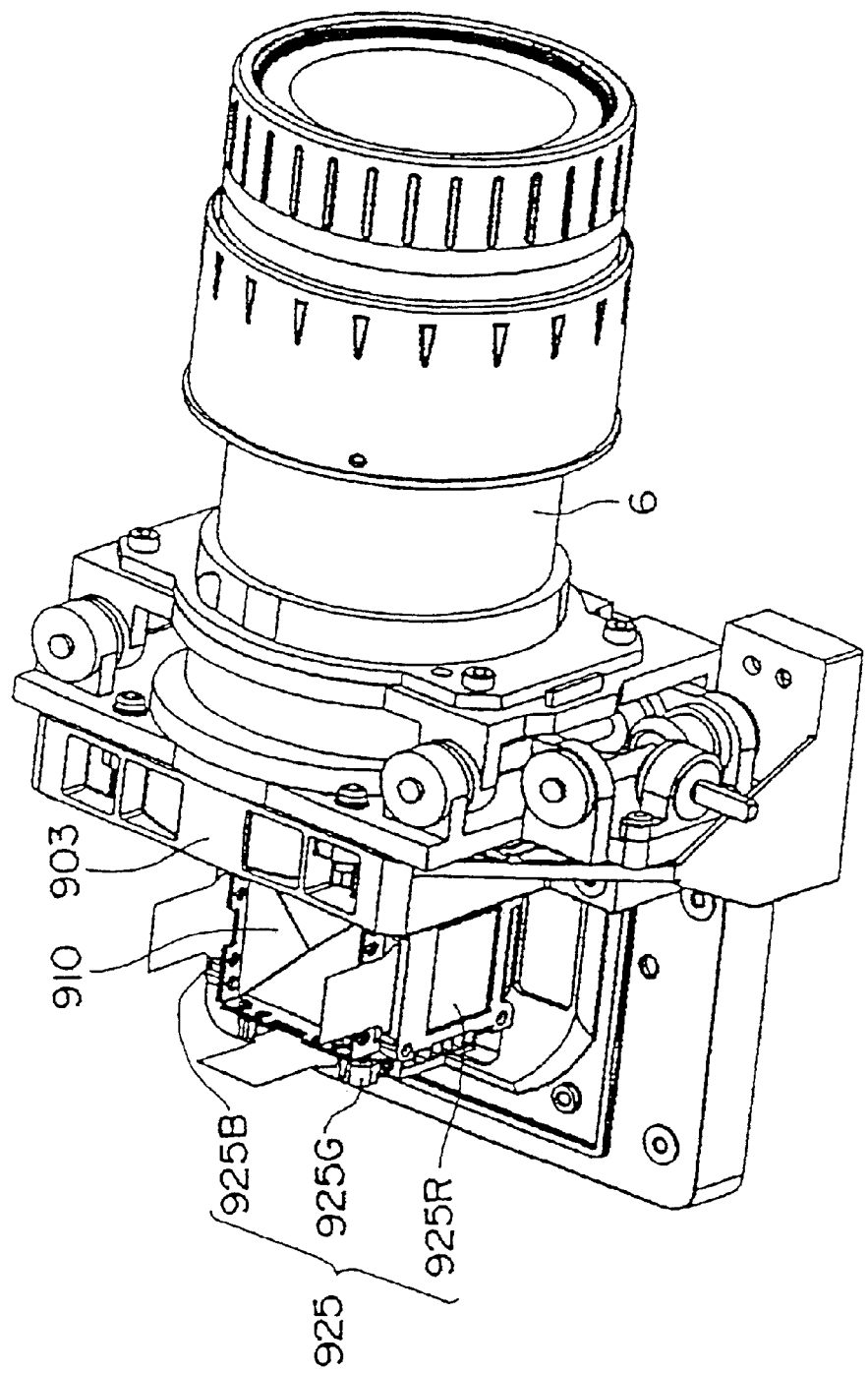

[Fig. 6]
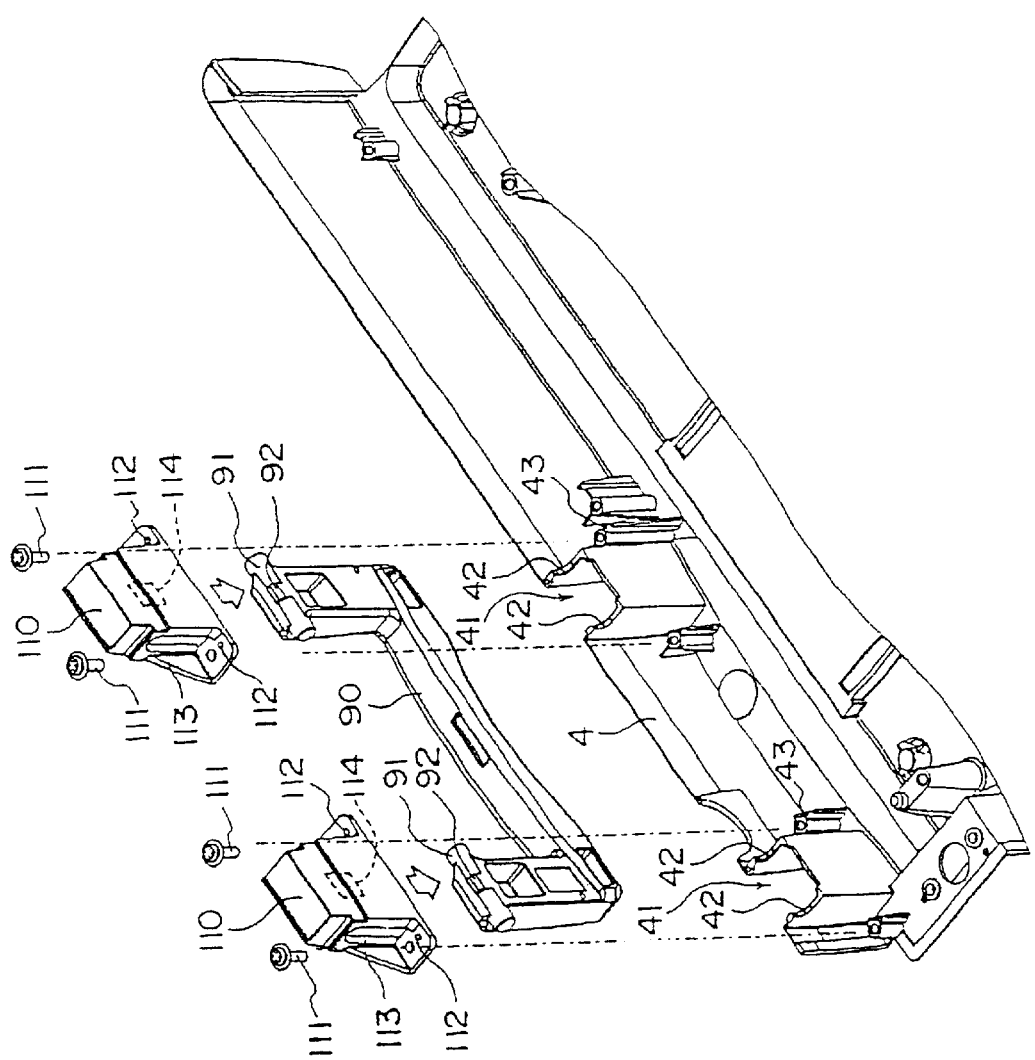

[Fig. 7]
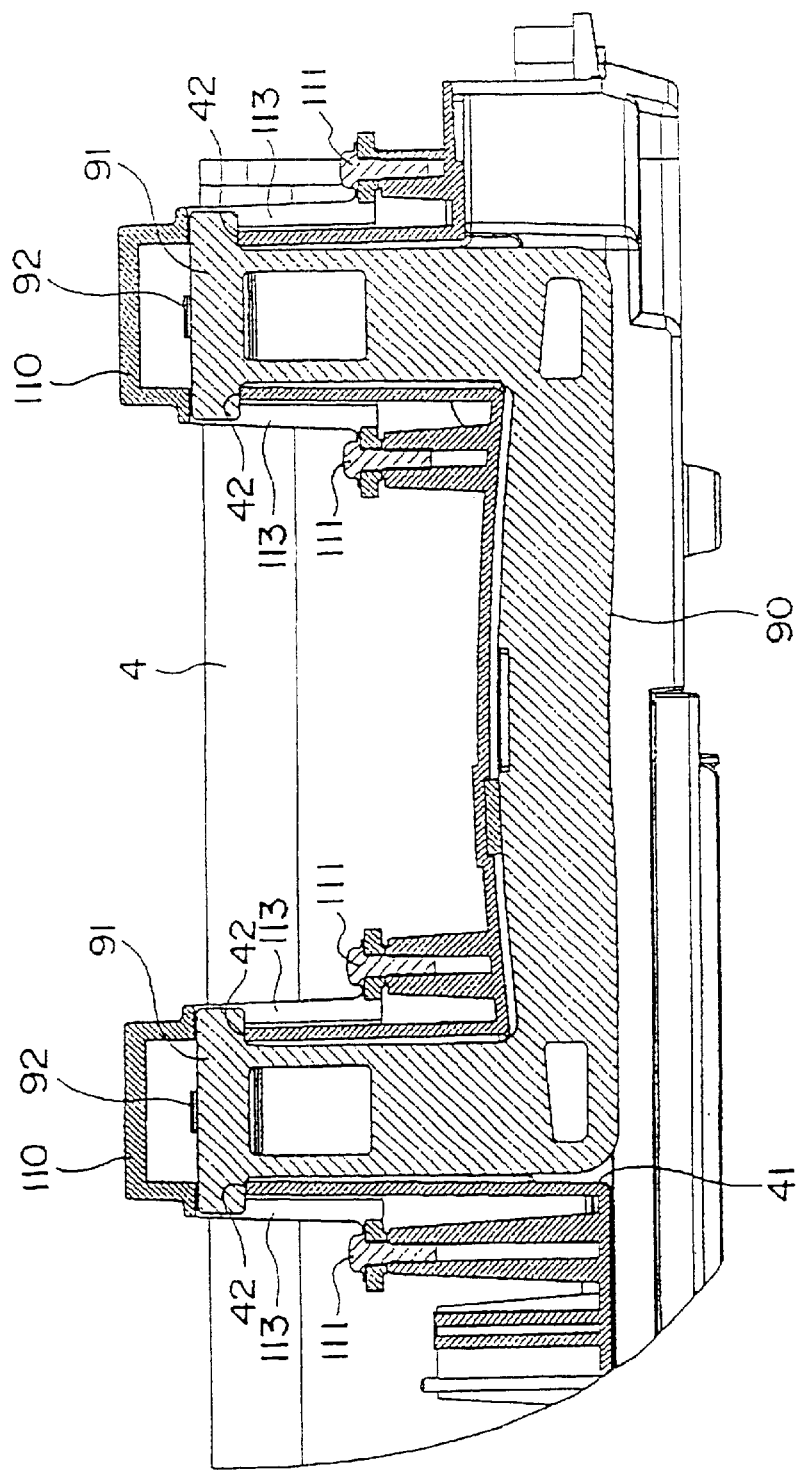

[Fig. 8]
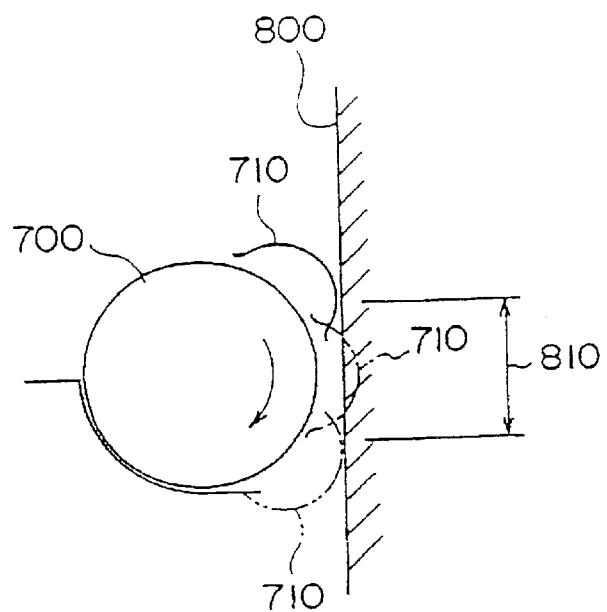

PROJECTOR

BACKGROUND OF THE INVENTION

1. Field of Invention

The present invention relates to a projector including an electro-optical device for forming an optical image according to image information, a projection lens for enlarging and projecting the image formed by the electro-optical device, a housing for accommodating these components, and a handle pivotally mounted on the housing, in which the handle and the housing are made of different materials.

2. Description of Related Art

Hitherto, projectors have been known which include a light source, an electro-optical device for forming an optical image according to image information by using a light beam emitted from the light source, and a projection lens for enlarging and projecting the image formed by the electro-optical device.

Such projectors are widely used for multimedia presentations at conferences, academic meetings, exhibitions, and the like.

While the projector is sometimes kept installed in a conference room or the like for a presentation, it is sometimes brought in as necessary, or is stored in another place after use. Therefore, the projector is provided with a handle for easy carrying. Some of the handles are of the type that is pivotally mounted on the housing of the projector so that it is pivoted to be raised during carrying, and is down out of the way in other states. Most of the handles are made of resin that is excellent in formability and is inexpensive, thereby reducing the cost of parts.

In the above-described handle, as shown in FIG. 8, when a pivoting axis 700 is turned by a predetermined angle, a projection 710 makes contact with a contact portion 810 on the inner surface of a housing 800 (one-dot chain line), passes the contact portion 810, and is retained on the inner surface (two-dot chain line), whereby the position of the handle is maintained at the turned position.

The housing on which the handle is mounted is, however, sometimes made of metal for the purpose of ensuring rigidity of the entire device. That is, in such a case, since the projection of the handle made of resin and the housing made of metal make contact every time the handle is turned, the resin handle is easily worn, and it is impossible to maintain the position of the handle.

SUMMARY OF THE INVENTION

An object of the present invention is to provide a projector in which the position of a handle can be reliably maintained even when a housing and the handle are made of different materials.

A projector of the present invention includes an electro-optical device for forming an optical image according to image information, a projection lens for enlarging and projecting the image formed by the electro-optical device, a housing for accommodating the electro-optical device, and a handle pivotally mounted on the housing, the handle and the housing being made of different materials. The handle and the housing have a handle-side contact portion and a housing-side contact portion, respectively, for maintaining the position of the handle by frictional resistance produced by contact therebetween, and the handle-side contact portion and the housing-side contact portion are made of the same kind of material.

In the present invention, the position of the handle is maintained with the handle-side contact portion and the housing-side contact portion being in contact with each other. Since the contact portions are made of the same kind of material, there is no fear that one of the contact portions will undergo localized wear. Even when the housing and the handle are made of different materials, the position of the handle is reliably maintained.

In the projector of the present invention, the handle-side contact portion may be made of the same kind of material as that of the handle, the housing-side contact portion may be made of the same kind of material as that of the handle, and the housing-side contact portion may be provided in a fixed member fixed to the housing.

That is, on the side of the handle that is a smaller member than the housing, since the material of the handle-side contact portion conforms to the material of the handle, it is easy to integrally form the handle and the handle-side contact portion. On the side of the housing, since the housing is a relatively large component, the fixed member can be made sufficiently large in conformity with the housing. Therefore, the fixed member is easily handled, and is reliably fixed to the housing by using, for example, screws.

In this case, it is preferable that the fixed member serve as a member for mounting the handle on the housing.

In such a case, the handle is reliably mounted on the housing by the fixed member, and there is no need to provide another member especially for mounting the handle, which reduces the number of components.

Furthermore, it is preferable in the projector of the present invention that the housing have, on the outer side, an indented holding section for holding the handle therein, that the handle be pivotally supported in the holding section, and the fixed member be fixed in engagement with the holding section.

When the handle is merely provided outside of the housing, it is entirely exposed, and this is not visually preferable. By forming the holding section in the housing and holding the handle therein, however, the outward appearance is visually simplified and is made preferable. Furthermore, since the handle is pivotally supported by using the holding section, there is no need to provide another structure for pivotal support only, and the structure is simplified. Furthermore, the fixed member is easily and reliably positioned with respect to the housing by being engaged with the holding section, which allows a quick fixing operation.

In the projector of the present invention, the housing-side contact portion of the fixed member may be provided on the surface along the direction in which the fixed member is fixed to the housing.

Although the position of the fixed member with respect to the housing sometimes varies in the fixing direction, the handle-side contact portion and the housing-side contact portion can be contacted each other with a fixed contact resistance in the present invention, regardless of such variations in position in the fixing direction. This can reduce the possibility of defective conditions where the urging manner of the handle varies from one projector to another.

According to the present invention described above, since the handle-side contact portions and the housing-side contact portions are made of the same kind of material, when the position of the handle is maintained with the contact portions being in contact with each other, there is no fear that one of the contact portions will undergo localized wear. Even when the housing and the handle are made of different materials, it is possible to reliably maintain the position of the handle.

BRIEF DESCRIPTION OF THE DRAWINGS

FIG. 1 is an outward perspective view of a projector according to an embodiment of the present invention, as viewed from a top side.

FIG. 2 is an outward perspective view of the projector, as viewed from a bottom side.

FIG. 3 is a perspective view showing the internal configuration of the projector.

FIG. 4 is a schematic view explaining the structure of an optical system.

FIG. 5 is a perspective view showing elements of the projector.

FIG. 6 is an exploded perspective view showing a principal part of the projector.

FIG. 7 is a longitudinal sectional view of the principal part of the projector.

FIG. 8 is a schematic view showing a conventional device.

DETAILED DESCRIPTION OF PREFERRED EMBODIMENTS

An embodiment of the present invention will be described below with reference to the drawings.

(1) Overall Configuration of the Device

FIGS. 1 and 2 are schematic perspective views of a projector 1 according to this embodiment. FIG. 1 is a perspective view, as viewed from the top side, and FIG. 2 is a perspective view, as viewed from the bottom side.

The projector 1 is of the type that separates a light beam emitted from a light-source lamp, which serves as a light source, into beams of the three primary colors, red (R), green (G), and blue (B), modulates these color light beams according to image information via liquid crystal panels constituting an electro-optical device, synthesizes the modulated color light beams by a prism (color synthesizing optical system), and enlarges and projects the synthesized light beams onto a projection plane via a projection lens 6. The components excluding a part of the projection lens 6 are housed inside an outer casing 2.

(2) Structure of Outer Casing

The outer casing 2 basically comprises an upper casing 3 for covering the top of the device, a lower casing 4 for forming the bottom of the device, a rear casing 5 (FIG. 2) for covering the rear of the device, and a front casing 9 for covering the front of the device. The casings are made of metal, such as magnesium, except for the rear casing 5 made of resin.

As shown in FIG. 1, many communication holes 25R and 25L for speakers are formed at the right and left front ends of the top surface of the upper casing 3. Between these communication holes 25R and 25L, a control panel 60 is disposed to control image quality and the like of the projector 1. Furthermore, a light receiving portion 70 is provided at the right top of the front casing 9 so as to receive an optical signal from a remote control that is not shown.

As shown in FIG. 2, an air inlet 240 is disposed at about the center of the bottom surface of the lower casing 4 so as to intake cooling air for cooling the inside of the device. The air inlet 240 is formed in a filter replacement cover 241 made of resin. A filter held inside can be replaced by attaching and detaching the filter replacement cover 241 to and from the side of the lower casing 4.

The bottom surface of the lower casing 4 is also provided with feet 31R and 31L at the right and left front corners, and a foot 31C at about the rear center end. By controlling the amount of vertical extension and retraction of the feet 31R and 31L, the inclination of the projector can be changed.

In one of the upright portions of the lower casing 4, a handle 90 is provided to carry the device 1 therewith. The handle 90 is turnable within an angle range of approximately 90° from the retracted state, as shown by a two-dot chain line in FIG. 1, and is raised for use as necessary.

In the rear casing 5, as shown in FIG. 2, an AC inlet 50 for external power supply, and a group of various kinds of input-output terminals 51 are arranged. An air outlet 160 is formed adjacent to these input-output terminals 51 so as to serve as a ventilation opening for exhausting air inside the device therethrough. Furthermore, the light receiving portion 70 is provided at the rear casing 5 in the same manner as that of the front casing 9.

(3) Inner Configuration of the Device

FIG. 3 shows the inner configuration of the projector 1.

As this figure shows, a power supply unit 7 serving as a power supply that is placed on one side of the projection lens 6, a light-source lamp unit 8 placed in the rear of the power supply unit 7, an optical unit 10 forming an optical system, a driver board (not shown) for driving an electro-optical device 925 in the unit 10, a main board (not shown) for controlling the overall device 1, and the like are held inside the device 1.

The power supply unit 7 transforms electric power from the AC inlet 50 shown in FIG. 2, and supplies the power to the light-source lamp unit 8, the driver board, the main board, intake fans (not shown) placed below, or below and above the electro-optical device 925, an exhaust fan 16 placed behind the light-source lamp unit 8, and the like. The power supply unit 7 includes a power-supply circuit substrate on which a power-supply filter, a transformer, a rectifier circuit, a smoothing circuit, a voltage stabilizing circuit, and the like may be formed, a lamp driving substrate for driving a light-source lamp 181 in the light-source lamp unit 8, and the like.

The light-source lamp unit 8 is a light-source section of the projector 1, and includes a light-source device 183 including the light-source lamp 181 and a reflector 182, and a lamp housing (not shown) for housing the light-source device 183, as shown in FIG. 4. Such a light-source lamp unit 8 is cooled by cooling air from the above-described intake fan and cooling air drawn from the clearance between the outer casing 2 and the projection lens 6. Cooling air first cools the electro-optical device 925, the power supply unit 7, and the like immediately after being drawn in, and flows backward to cool the inside of the device 1. Finally, most of the cooling air passes through the light-source lamp unit 8, and is exhausted by the exhaust fan 16. Since the light-source lamp unit 8 is placed just before the exhaust fan 16, the light source device 183 therein can be efficiently cooled by a large amount of cooling air.

The optical unit 10 is a unit that forms an optical image corresponding to image information by optically processing a light beam emitted from the light-source lamp unit 8, and includes an illumination optical system 923, a color separation optical system 924, the electro-optical device 925, and a prism unit 910 serving as a color synthesizing optical system. The optical elements in the optical unit 10 other than the electro-optical device 925 and the prism unit 910 are vertically held between upper and lower light guides (not shown). The upper light guide and the lower light guide are combined into one and are fixed to the lower casing 4 by fixing screws. These light guides are also fixed to the prism unit 910 by fixing screws.

The prism unit 910 shaped like a rectangular parallelepiped is fixed by fixing screws to the rear side of a head member 903 formed of an integrally molded piece of magnesium and having a nearly L-shaped profile, as shown in FIG. 5. Liquid crystal panels 925R, 925G, and 925B for constituting the electro-optical device 925 are fixed to three side faces of the prism unit 910 via a fixed member.

Although not shown, a driver board for driving and controlling the liquid crystal panels 925R, 925G, and 925B in the electro-optical device 925 is disposed above the optical unit 10. A main board with a control circuit for controlling the entire projector 1 is placed thereon. The main board is electrically connected to the driver board and the control panel 60 described above.

(4) Configuration of Optical System

Next, the configuration of the optical system in the projector 1, i.e., the optical unit 10, will be described with reference to FIG. 4 as a schematic view.

As described above, the optical unit 10 includes the illumination optical system 923 for making uniform the in-plane illumination distribution of a light beam (W) from the light-source lamp unit 8, the color separation optical system 924 for separating the light beam (W) from the illumination optical system 923 into red (R), green (G), and blue (B) beams, the electro-optical device 925 for modulating the color beams R, G, and B according to image information, and the prism unit 910 for synthesizing the modulated color beams.

The illumination optical system 923 includes a first lens plate 921, a second lens plate 922 disposed on the emitting side of the first lens plate 921, and a reflecting mirror 931 for bending an optical axis 1a of the light beam W emitted from the light-source lamp unit 8 toward the front of the device 1.

The first lens plate 921 includes a plurality of rectangular lenses arranged in a matrix, splits the light beam emitted from the light source into a plurality of partial beams, and condenses the partial beams near the second lens plate 922.

The second lens plate 922 includes a plurality of rectangular lenses arranged in a matrix, and has the function of superimposing the partial beams emitted from the first lens plate 921 onto the liquid crystal panels 925R, 925G, and 925B (which will be described later) for constituting the electro-optical device 925.

In this way, since the liquid crystal panels 925R, 925G, and 925B can be illuminated with light having substantially uniform illuminance by the illumination optical system 923 in the projector 1 of this embodiment, it is possible to obtain a projection image having uniform illuminance.

The color separation system 924 includes a blue and green reflecting dichroic mirror 941, a green reflecting dichroic mirror 942, and a reflecting mirror 943. First, a blue beam B and a green beam G contained in the light beam W emitted from the illumination optical system 923 are perpendicularly reflected by the blue and green reflecting dichroic mirror 941, and travel toward the green reflecting dichroic mirror 942.

A red beam R passes through the blue and green reflecting dichroic mirror 941, is perpendicularly reflected by the reflecting mirror 943 disposed at the rear thereof, and emerges from an emitting portion 944 for the red beam R toward the prism unit 910.

Next, only the green beam G of the blue and green beams B and G reflected by the blue and green reflecting dichroic mirror 941 is perpendicularly reflected by the green reflecting dichroic mirror 942, and emerges from an emitting portion 945 for the green beam G toward the prism unit 910.

The blue beam B passed through the green reflecting dichroic mirror 942 emerges from an emitting portion 946 for the blue beam B toward a relay optical system 927. In this embodiment, the distances from an emitting portion of the illumination optical system 923 for the light beam W to the emitting portions 944, 945, and 946 of the color separation optical system 924 for the color beams R, G, and B are set to be equal.

On the emitting sides of the emitting portions 944 and 945 of the color separation optical system 924 for the red and green beams R and G, condenser lenses 951 and 952 are disposed, respectively. Therefore, the red and green beams R and G emitted from the emitting portions enter these condenser lenses 951 and 952, where they are collimated.

The red and green beams R and G thus collimated pass through incident-side polarizers 960R and 960G, and enter the liquid crystal panels 925R and 925G, where they are modulated and given corresponding image information. That is, these liquid crystal panels 925R and 925G are subjected to switching control according to image information by the above-described driver board, thereby modulating the color beams passing therethrough.

In contrast, the blue beam B is guided to the corresponding liquid crystal panel 925B via the relay optical system 927, where it is similarly subjected to modulation according to image information. As the liquid crystal panels 925R, 925G, and 925B of this embodiment, for example, liquid crystal panels may be adopted that use polysilicon TFT's as a switching elements.

The relay optical system 927 includes a condenser lens 954 disposed on the emitting side of the emitting portion 946 for the blue beam B, an incident-side reflecting mirror 971, an emitting-side reflecting mirror 972, an intermediate lens 973 interposed between these reflecting mirrors, and a condenser lens 953 disposed before the liquid crystal panel 925B. The blue beam B emerging from the condenser lens 953 passes through an incident-side polarizer 960B, and enters the liquid crystal panel 925B, where it undergoes modulation.

In this case, the optical axis 1a of the light beam W and the optical axes 1r, 1g, and 1b of the color beams R, G, and B are formed in the same plane. The blue beam B has the longest one of the optical path lengths of the color beams, namely, the distances from the light-source lamp 181 to the liquid crystal panels. Therefore, this light beam undergoes the largest light loss. The light loss can, however, be reduced by interposing the relay optical system 927.

Next, the color beams R, G, and B modulated through the liquid crystal panels 925R, 925G, and 925B pass through emitting-side polarizers 961R, 961G, and 961B, and enter the prism unit 910, where they are synthesized. A color image formed by synthesis by the prism unit 910 is enlarged and projected via the projection lens 6 onto a projection plane 100 that is disposed at a predetermined position.

(5) Projecting Structure of Handle

FIG. 6 is an exploded perspective view of a mounting portion of the handle 90, and FIG. 7 is a sectional view of the mounting portion of the handle 90, taken at about the center of the handle 90 along the lower casing 4 on which the handle 90 is mounted.

As shown in FIGS. 6 and 7, the handle 90 is an angular U-shaped molded resin part, and has, at both ends, pivoting axes 91 molded integrally therewith. Projections 92 serving as handle-side contact portions are integrally molded on the peripheral surfaces of the pivoting axes 91. Therefore, the projections 92 are made of the same material as that of the handle 90. Such a handle 90 is held in an indented holding section 41 formed on the side face of the lower casing 4 (see FIGS. 1 to 3), and the pivoting axes 91 of the handle 90 are rotatably supported on support portions 42 formed at the top end of the holding section 41.

On the other hand, fixed members 110, which are just larger than the cross section of the holding section 41, are engaged with both top ends of the holding section 41 of the lower casing 4. The fixed members 110 are molded resin parts made of the same material as that of the handle 90 (the projections 92), and are fixed to the lower casing 4 by screws 111 in engagement with the holding section 41. In this case, small vertical holes 112 (FIG. 6) are bored in proximity to screw holes of the fixed members 110. Engaging portions 43 of the lower casing 4 are fitted in the corresponding small holes 112, thereby positioning the fixed members 110.

The pivoting axes 91 of the handle 90 are held between the support portions 42 and the upper inner faces of opening portions 113 formed in the fixed members 110, which allows the handle 90 to be mounted on the lower casing 4. In short, the fixed members 110 also serve as members for mounting the handle 90 on the lower casing 40.

Portions enclosed by dotted lines in FIG. 6 are housing-side contact portions (hereinafter abbreviated as "contact portions") 114 formed on the inner surfaces of the fixed members 110. When the handle 90 is turned, the projections 92 of the pivoting axes 91 make contact with the contact portions 114. The surfaces on which the contact portions 114 are formed are vertical faces along the fixing direction of the fixed members 110 (the empty arrows in the figure). The projections 92 press the contact portions 114 in the direction orthogonal to the fixing direction, thereby producing contact resistance between the projections 92 and the contact portions 114.

(6) Advantages of the Embodiment

The above-described embodiment provides the following advantages.

That is, in the projector 1, the position of the handle 90 is maintained with the projections 92 formed in the handle 90 and the contact portions 114 of the lower casing 4 being in contact with each other. Since both the projections 92 and the contact portions 114 are made of resin, that is, made of the same kind of material, there is no fear that one of the projections 92 and the contact portions 114 will undergo localized wear. Even when the lower case 4 is made of metal and the handle 90 is made of resin, the handle 90 can sufficiently withstand repetitive operations, and the position thereof can be reliably maintained.

Moreover, since the handle 90 and the projections 92 are made of the same material, they can be integrally molded, and the handle 90, which is smaller than the lower casing 4, can be easily formed without assembling another member.

Although the fixed members 110 with the contact portions 114 are separate from the lower casing 4, they can be formed sufficiently large in conformity with the lower casing 4 because the lower casing 4 is a relatively large component. Therefore, the fixed members 110 can be easily handled, and can be reliably fixed to the lower casing 4 by the screws 111.

Furthermore, since the fixed members 110 also serve as the mounting members for mounting the handle 90 on the lower casing 4, the handle 90 can be reliably mounted on the lower casing 4 via the fixed members 110, and there is no need to provide another member especially for mounting the handle 90, which reduces the number of components.

Since the indented holding section 41 is formed on the outer surface of the lower casing 4 so as to hold the handle 90 therein, the handle 90 is held in the holding section 41 when it is not used. This makes it possible to visually simplify the projector 1, and to make the outward appearance thereof preferable.

Since the handle 90 is pivotally supported by using the holding section 41, there is no need to provide another structure especially for pivot support, and the structure can be simplified.

Since the fixed members 110 are engaged with the holding section 41, they are positioned with respect to the lower casing 4, that is, the engaging portions 43 of the lower casing 4 and the small holes 112 of the fixed members 110 are easily fitted by sliding the fixed members 110 along the holding section 41, which makes it possible to easily and quickly perform an operation of fixing the fixed members 110.

In this embodiment, the positions of the fixed members 110 sometimes vary in the fixing direction due to variations in fastening torque of the screws 111, and for other reasons. Since the contact portions 114 of the fixed members 110 are formed on the vertical surfaces of the fixed members 110 along the fixing direction in this embodiment, however, even when the positions of the fixed members 110 vary in such a fixing direction, the projections 92 of the handle 90 and the contact portions 114 can be contacted with each other with a fixed contact resistance. This can reduce the possibility of defective conditions where the urging manner of the handle 90 varies from one projector 1 to another.

(7) Modifications of the Embodiment

The present invention is not limited to the above-described embodiment, and includes the following modifications.

For example, while the handle 90 and the projections 92 are integrally molded in the above embodiment, they may be formed of separate members, and may be combined into one by being assembled with each other. Since the handle 90 and the projections 92 are relatively small, when they are separate members, there is a possibility that it may take much time to perform the operation of the assembling the members. For this reason, in a case in which the handle 90 and the projections 92 are made of the same kind of material, it is preferable that they be integrally molded, as in the embodiment.

While all of the handle 90, the projections 92, and the fixed members 110 are made of the same material in the above embodiment, since it is satisfactory, according to the present invention, as long as only the projections 92 and the fixed members 110 are made of the same kind of material, the handle 90 and the projections 92 may be made of different materials. For example, when the lower casing 4 is made of metal and the handle 90 is made of resin as in the above embodiment, the projections 92 and the fixed members 110 may be made of wood, ceramic, or the like.

The present invention may also include a case in which the fixed members 110 are made of metal and the projections 92 are also made of metal. In such a case, the projections 92 of metal may be molded integrally with the handle 90 by insert molding, or the portions that substitute for the fixed members 110 may be molded integrally with the lower casing 4. By doing this, it is possible to eliminate the need for the fixed members 110, and to further reduce the number of components.

While the electro-optical device 925 is composed of the TFT-drive liquid crystal panels 925R, 925G, and 925B in the above embodiment, the present invention may be applied to a projector including an optical modulation device of other drive types, such as TN-drive or STN-drive.

While the electro-optical device 925 is composed of the three liquid crystal panels 925R, 925G, and 925B in the above embodiment, the present invention may be applied to an optical modulation device composed of one or two liquid crystal panels.

While the panels constituting the electro-optical device 925 are composed of liquid crystal devices in the above embodiment, the present invention may be applied to a projector including an optical modulation device other than liquid crystal, such as that composed of plasma devices, or device panels using micro-mirrors.

While the electro-optical device 925 in the above embodiment is of the type that transmits and modulates the light beams R, G, and B, the present invention may be applied to a projector including a reflective optical modulation device that reflects, modulates, and emits incident light.

Other specific structures, shapes, and the like for carrying out the present invention may be replaced with other structures and the like as long as the object of the present invention can be achieved.

What is claimed is:

1. A projector comprising:

an electro-optical device for forming an optical image according to image information;

a projection lens for enlarging and projecting the image formed by said electro-optical device;

a housing for accommodating said electro-optical device; and a handle pivotally mounted on said housing, said handle and said housing being made of different materials, said handle having a handle-side contact portion and said housing having a housing-side contact portion that maintain a position of said handle by frictional resistance produced by contact therebetween, and said handle-side contact portion and said housing-side contact portion being made of a same material.

2. The projector according to claim 1, said handle-side contact portion being made of a same material as said handle, and said housing-side contact portion being made of the same material as said handle, and said housing-side contact portion being provided in a fixed member fixed to said housing.

3. The projector according to claim 2, said fixed member serves as a member for mounting said handle on said housing.

4. The projector according to claim 2, said housing having, on an outer side, an indented holding section that holds said handle therein, said handle being rotatably supported in said holding section, and said fixed member being fixed in engagement with said holding section.

5. The projector according to claim 3, said housing having, on an outer side, an indented holding section that holds said handle therein, said handle being rotatably supported in said holding section, and said fixed member being fixed in engagement with said holding section.

6. The projector according to claim 2, said housing-side contact portion of said fixed member being provided on a surface of said housing along a direction in which said fixed member is fixed to said housing.

7. The projector according to claim 3, said housing-side contact portion of said fixed member being provided on a surface of said housing along a direction in which said fixed member is fixed to said housing.

8. The projector according to claim 4, said housing-side contact portion of said fixed member being provided on a surface of said housing along a direction in which said fixed member is fixed to said housing.

9. The projector according to claim 2, further comprising engaging projections formed on said housing and holes formed on said fixed member, said holes on said fixed member engaging with said engaging projections on said housing.

\* \* \* \* \*